April 9, 1940. A. L. HAMM 2,196,496

APPARATUS FOR THE RECOVERY OF HEAT AND CHEMICALS FROM BLACK LIQUOR

Filed March 2, 1938 2 Sheets-Sheet 1

INVENTOR
Alex L. Hamm
BY
Synnestvedt & Lechner
ATTORNEYS

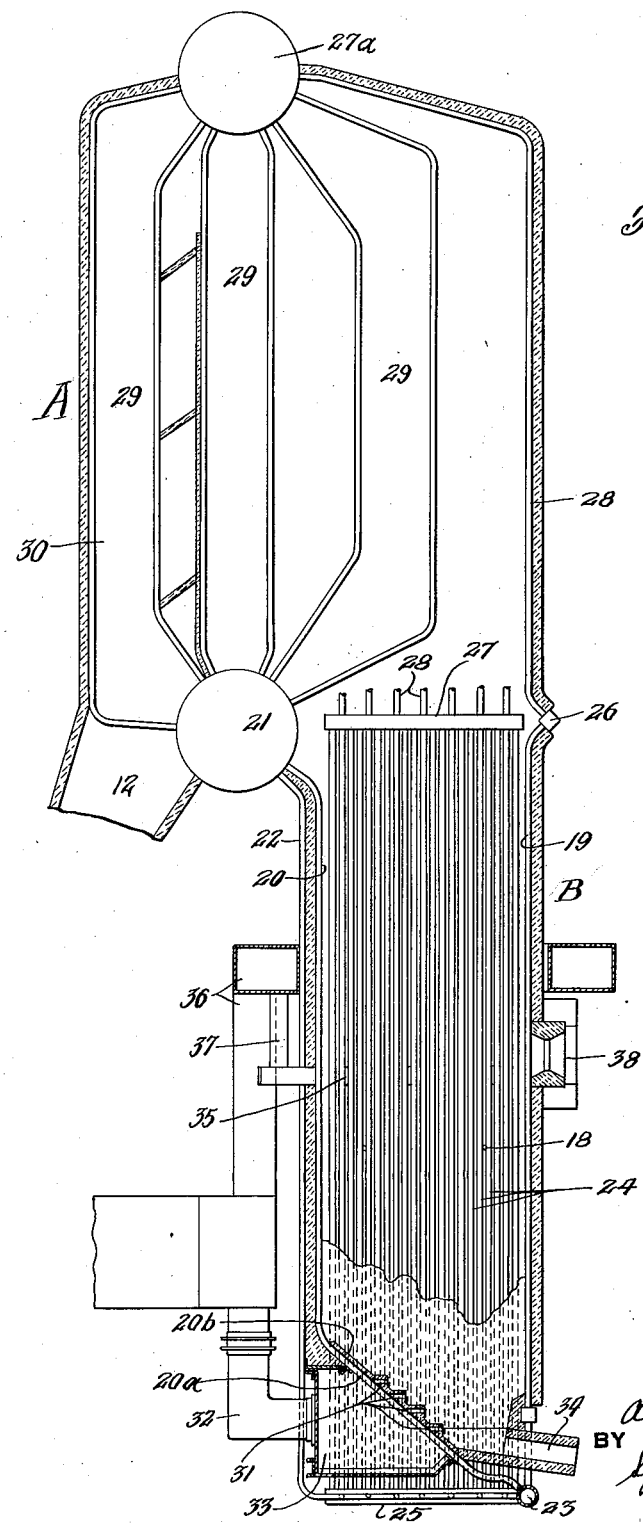

Patented Apr. 9, 1940

2,196,496

UNITED STATES PATENT OFFICE 2,196,496

APPARATUS FOR THE RECOVERY OF HEAT AND CHEMICALS FROM BLACK LIQUOR

Alexander Leopold Hamm, New York, N. Y., assignor to Combustion Engineering Company, Inc., New York, N. Y., a corporation of Delaware Application March 2, 1938, Serial No. 193,409

4 Claims. (Cl. 23—262)

This invention relates to apparatus for the recovery of heat and chemicals from black liquor obtained in the preparation of pulp from wood by the caustic soda or the sulphate process. In general, such apparatus includes evaporators for removing water from the black liquor, a recovery furnace, and a waste heat boiler associated with the furnace.

The primary object of my invention is the provision of an improved waste heat boiler for use in recovery apparatus of the above character.

Another object of my invention is the provision of means for effectively recovering chemicals and combustible particles from the waste gases passing through the waste heat boiler.

A more specific object resides in the provision of means for scrubbing the waste gases of valuable chemicals and other substances so associated with the boiler as to eliminate the need for the usual settling hoppers from which accumulations must be removed periodically.

A further object of my invention resides in incorporating scrubbing means of the above character within the system for treating the black liquor.

How the foregoing, together with such other objects and advantages as will hereinafter appear or are incident to my invention are realized, is illustrated in preferred form in the accompanying drawings, wherein—

Figure 2 is an enlarged sectional elevational view of the recovery furnace and waste heat boiler of the system.

Figure 1:
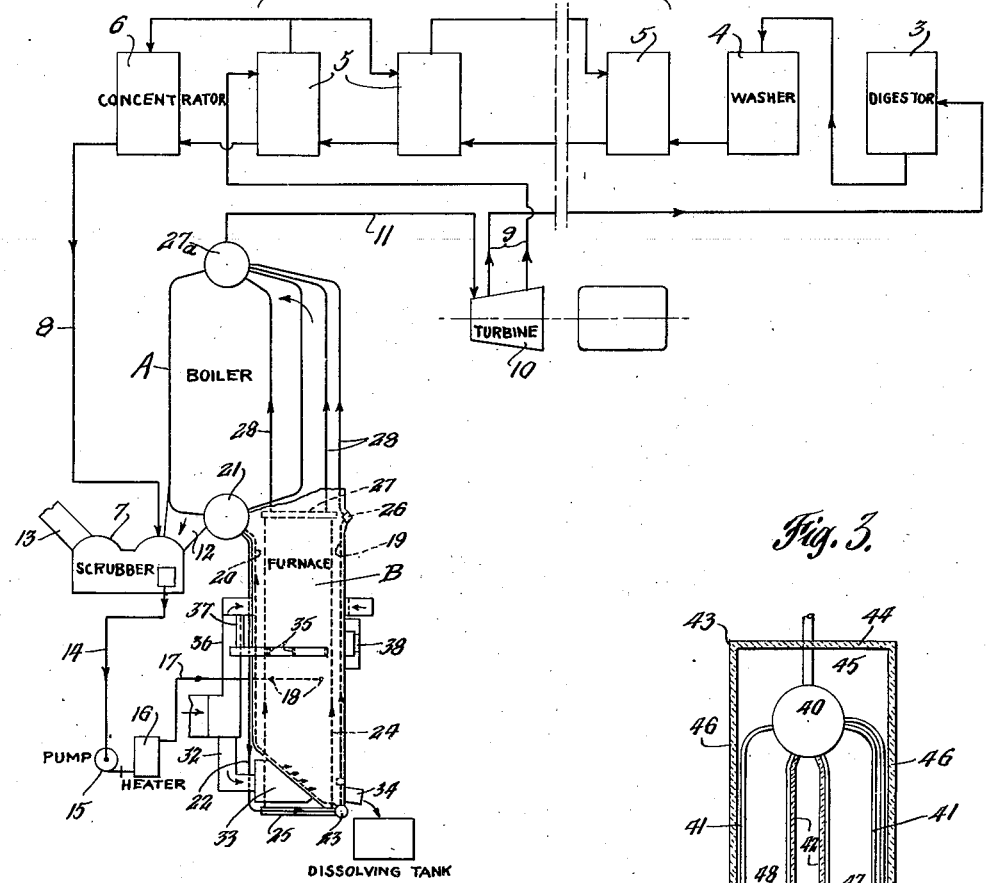
Figure 1 is a more or less diagrammatic elevational view of a recovery system embodying my invention.

Referring to Figure 1, digested pulp from the digester 3 is passed through the washer 4 in which the residual liquor is washed from the pulp and from which the wash or black liquor is withdrawn and passed through a multiple effect evaporator comprising a plurality of evaporating devices 5. The liquor is then passed through a concentrator 6 to further increase its density and then is led to a scrubber 7 as by means of a pipe 8 for further evaporation.

The digester and evaporators are supplied with steam as by means of pipes 9 leading from suitable stages of a turbine 10 which is connected by means of pipe 11 to receive steam from the waste heat boiler A associated with recovery furnace B. Waste gases are led from the boiler to the scrubber 7 as by means of a conduit 12 and are discharged therefrom through a stack 13 as will further appear hereinafter.

In passing the black liquor through the multiple effect evaporators the solid content of the liquor is raised to have a fuel density of from 50% to 60% of solids and this liquor after passing through the concentrator 6 and scrubber 7 is raised to have a solid content of 65% of solids or higher.

This concentrated liquor is led from the scrubber 7 through a pipe 14 to a pump 15, through a heater 16, and through pipe 17 to nozzles 18 which deliver preheated liquor into the recovery furnace B under pressure.

Referring to Figure 2, it will be seen that the recovery furnace B has its walls lined with bar or exposed upright water tubes which are connected into the circulation of the boiler, the front and rear wall tubes 19 and 20 receiving water from the lower drum 21 of the boiler by means of downcomer tubes 22 connected to a lower header 23 and the side wall tubes 24 by means of similar downcomer tubes leading to the lower headers 25, one of which is provided for each side wall. The rear wall tubes 20 are connected for delivery into the drum 21 at their upper ends, and their lower portions are inclined as indicated at 20a to provide with the refractory lining 20b a sloping bottom for the furnace. The front wall tubes 19 and the side wall tubes 24 are connected into headers 26 and 27 at their upper ends, which headers are connected for delivery into the upper steam and water drum 27a of the boiler by means of upcomer tubes 28.

The boiler is provided with upright banks of boiler tubes 29 and is baffled to provide a rear down pass 30 for the waste gases from which the gases enter the conduit 12, pass through the scrubber 7 and finally exit through the stack 13.

As above pointed out, the concentrated black liquor is preheated and led to the furnace under pressure by means of the fuel nozzles 18, and as it is introduced there is a reduction in pressure which causes some of the water in the liquor to flash into steam. Practically all of the remaining quantities of water are evaporated from the liquor in space and the solid content or black ash falls to the bottom or hearth portion of the furnace in almost dry state, where it accumulates in a bed. Preheated air is admitted into this bed as by means of inlets 31 in an amount to keep the bed incandescent and sufficient to maintain a reducing atmosphere in the bed. The preheated air is led to the inlets from a suitable source as by means of a conduit 32 and air chamber 33.

In this bed evaporation of the small percentage of moisture contained in the black ash occurs, distillation of the volatiles and burning of the solid combustible materials take place, and the sodium sulphate is converted into sodium sulphite which may be withdrawn through a discharge spout 34.

Preheated air to complete combustion is introduced into the furnace as by means of a plurality of air inlets 35, the air being led to the inlets by means of conduits 36 and 37.

The hot burning gases rise from the bed in countercurrent to the falling black ash and as the gas stream travels upwardly heat is absorbed by the wall tubes for the generation of steam. The furnace is initially heated up by introducing fuel as by means of a suitable burner 38, after which it is self-sustaining.

Since the furnace is tall the gases have a large distance to travel through so that condensation of chemicals carried in the gas stream occurs and the particles gravitate to the hearth for recovery together with other combustible particles of dry solids which may have been carried upward in the gas stream.

Any fine substances that are carried on through the boiler are finally delivered into the scrubber 7. The scrubber is provided with revolving discs 7a which dip into the liquor and expose a film of liquor to the waste gases, thereby not only evaporating water from the liquor but also washing the gases by the adhesion of the entrained solids onto the wet discs. These washed out solids add to the concentration of liquor and are returned to the recovery furnace with the concentrated liquor.

It will thus be seen that by locating the scrubber 7 at the bottom of the downward boiler pass 30 the carry-over of the boiler is delivered thereto and treated therein so that settling hoppers such as have been heretofore employed are unnecessary. Thus, the labor of removing and disposing of the accumulations in the hoppers is eliminated and the usual dust handling problem is overcome, it being noted that substantially all of the chemical and combustible solids are recovered from the waste gases before the gases discharge to the atmosphere.

Figure 3:
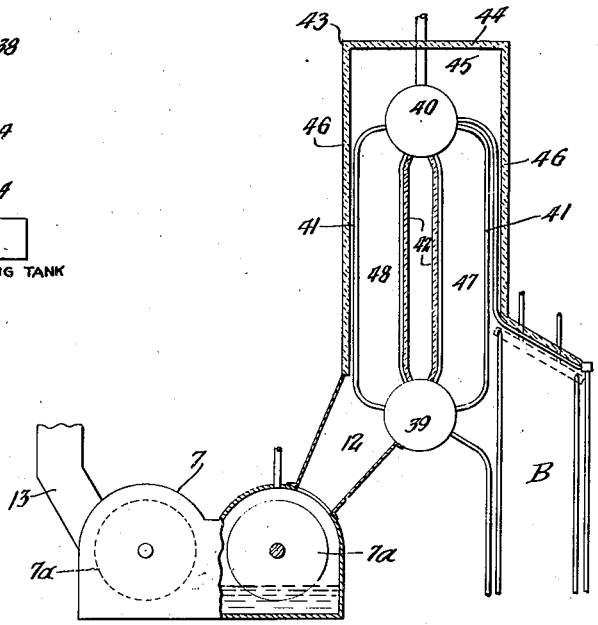
Figure 3 illustrates a boiler of modified form.

In Figure 3 I have illustrated a modified waste heat boiler having a lower drum 39, an upper drum 40, connecting banks of boiler tubes 41, and baffles 42 extending from the lower drum to the upper drum. A boiler casing 43 is provided, the top wall 44 of which is spaced above the upper drum 40 to provide a top gas space 45. The upright walls 46 of the casing and the baffles 42 provide two passes for the boiler. The products of combustion leaving the recovery furnace B pass upwardly in the front pass 47, then over the upper drum 40 through the top gas space 45, and then downwardly through the rear pass 48. The gases are led from the rear pass to the scrubber 7 by means of the conduit 12 for treatment in the scrubber as above described.

I claim:

1. In apparatus for recovering chemicals from black liquor, the combination of a water wall lined recovery furnace; nozzle means for introducing black liquor into said furnace; means for admitting the required air for combustion into said furnace; a waste heat boiler associated with the furnace, said boiler having a slagging section of vertically disposed tubes overhanging the furnace and paralleling the upward flow of the gas stream from the furnace, a final downward pass for the waste gases, and an outlet for the discharge of waste gases at the bottom of said pass; a scrubber connected to said outlet to recover carry-over from the discharging waste gases; means for introducing black liquor into said scrubber; means for discharging waste gases freed of such carry-over from said scrubber; and means for leading treated black liquor and recovered carry-over to said nozzle means.

2. In apparatus for recovering chemicals from black liquor, the combination of a water wall lined recovery furnace; nozzle means for introducing black liquor into said furnace; means for admitting the required air for combustion into said furnace; a waste heat boiler located above the furnace, said boiler having an upward pass in direct communication with the furnace, a rear downward pass, vertical boiler tubes in said upward pass paralleling the upward flow of the gas stream from the furnace and constituting a slagging section of the boiler, vertical boiler tubes in said rear pass and baffle means associated with the boiler tubes to provide said passes; an outlet at the bottom of said rear pass; a scrubber having an inlet connected to said outlet whereby waste gases and carry-over discharge from the boiler into said scrubber; means for introducing black liquor into said scrubber; means for discharging waste gases freed of such carry-over from said scrubber; and means for leading treated black liquor and recovered carry-over to said nozzle means.

3. In apparatus for recovering chemicals from black liquor, the combination of a water wall lined recovery furnace; nozzle means for introducing black liquor into said furnace; means for admitting the required air for combustion into said furnace; an upright waste heat boiler above said furnace, said boiler having an upper drum, a lower drum, a front set of vertical boiler tubes connecting said drums and constituting a slagging section of the boiler, a rear set of vertical boiler tubes connecting said drum and baffle means extending from the lower to the upper drum between said sets of boiler tubes; casing structure associated with said boiler to provide with said baffle means a boiler pass in which the front set of vertical boiler tubes is located through which the gases from the furnace pass in upward flow parallel to said tubes, a rear downward boiler pass in which the rear set of vertical boiler tubes is located through which said gases pass in downward flow, and an upper chamber above said upper drum establishing communication from the upward pass to the downward pass; a scrubber evaporator at the bottom of said rear pass in communication therewith to receive waste gases and carry-over from said rear pass; means for introducing black liquor into said scrubber evaporator; means for discharging waste gases freed of such carry-over from said scrubber evaporator, and means for leading treated liquor and recovered carry-over to said nozzle means.

4. In apparatus for recovering chemicals from black liquor, the combination of a water wall lined recovery furnace; nozzle means for introducing black liquor into said furnace; means for admitting the required air for combustion into said furnace; an upright waste heat boiler above said furnace, said boiler having an upper drum, a lower drum, a front set of vertical boiler tubes connecting said drums and extending directly over the furnace to provide with the water walls of the furnace a tall cooled passage through which the gases flow upwardly in parallel relation to the vertical boiler tubes, a rear set of vertical boiler tubes connecting said drums, baffling between said sets of tubes for providing a rear downward pass in which the rear set of vertical tubes is located, and an outlet for the gases at the bottom of said rear pass; a scrubber evaporator connected to said outlet to receive waste gases and carry-over from said rear pass; means for introducing black liquor into said scrubber evaporator, and means for leading treated liquor and recovered carry-over to said nozzle means.

ALEX. L. HAMM.